United States Patent [19]

Rasquin

[11] 3,999,002
[45] Dec. 21, 1976

[54] TERMINAL CONNECTOR FOR HIGH-ENERGY ELECTRIC CABLES WITH INTERNAL COOLING

[75] Inventor: Werner Rasquin, Cologne, Germany

[73] Assignee: Felten & Guilleaume Kabelwerke AG, Cologne, Germany

[22] Filed: June 27, 1975

[21] Appl. No.: 591,066

[30] Foreign Application Priority Data

Aug. 8, 1974 Germany .......................... 2438166

[52] U.S. Cl. .............................. 174/15 BH; 174/19
[51] Int. Cl.² ...................... H01B 7/34; H01B 17/54
[58] Field of Search ........ 174/15 R, 15 BH, 16 BH, 174/19, 11 BH, 12 BH

[56] References Cited

UNITED STATES PATENTS

| 2,820,086 | 1/1958 | Nicholas ........................... 174/19 X |
| 3,013,101 | 12/1961 | Domenach ....................... 174/19 X |
| 3,600,709 | 8/1971 | Ditscheid et al. ............. 174/15 BH |
| 3,758,699 | 9/1973 | Lusk ............................... 174/15 BH |
| 3,792,220 | 2/1974 | Yoshioka ....................... 174/15 BH |
| 3,876,820 | 4/1975 | Mashikian ........................... 174/19 |
| 3,902,000 | 8/1975 | Forsyth et al. ................. 174/15 BH |

*Primary Examiner*—Arthur T. Grimley
*Attorney, Agent, or Firm*—Michael J. Striker

[57] ABSTRACT

An internally cooled high-energy cable is equipped with terminal connector assemblies for supplying electric current thereto and withdrawing the current therefrom, and with terminal connector assemblies for supplying a cooling medium to the cable and discharging the spent cooling medium therefrom. A connecting pipe connects the two assemblies at each end of the cable and conducts the cooling medium from one to the other. The flow-through cross section of the channel for conducting the cooling medium through the cooling medium terminal connector assembly is smaller than the flow-through cross section of the cooling channel of the cable which results in more rapid flow of the cooling medium through the former channel and in enhanced cooling effect, so that the heat resulting from the decline in the electric potential of the cooling medium in the cooling medium terminal connector assembly is effectively dissipated. The channel in the connecting pipe may decrease from a cross section corresponding to the cross section of the cooling channel of the cable to that corresponding to the cross section of the cooling channel in the cooling medium terminal connector assembly whereby the region of turbulent flow caused by the reduction in the flow-through cross section is distant from the cooling medium terminal connector.

11 Claims, 1 Drawing Figure

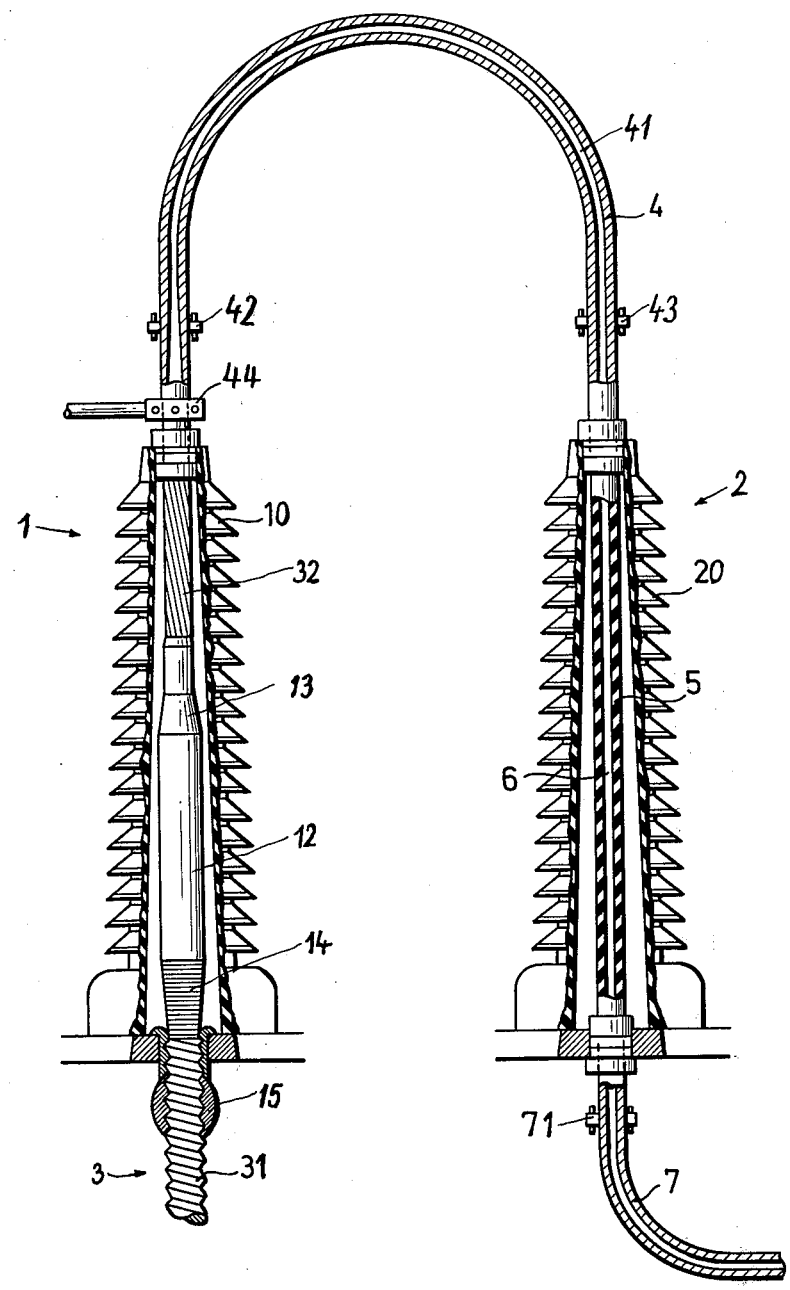

3,999,002

TERMINAL CONNECTOR FOR HIGH-ENERGY ELECTRIC CABLES WITH INTERNAL COOLING

BACKGROUND OF THE INVENTION

The present invention relates to a terminal connector for high-energy electric cables with internal cooling, particularly for water-cooled cables.

There are already known various terminal connectors for, on the one hand, supplying the electric current and the cooling medium, such as oil or water, to the cable and, on the other hand, for withdrawing the electric current and discharging the spent cooling medium from the cable at a distance. The known terminal connectors usually comprise two distinct terminal connector assemblies, one for the electric current and the other for the cooling medium. When considered in the direction of flow of the cooling medium, the terminal connector assembly for the cooling medium is upstream of the terminal connector assembly for the electric current at the upstream end of the cable, and downstream thereof at the downstream end of the cable. A connecting pipe connects the two terminal connector assemblies at each end of the cable and conducts the cooling medium from one of the assemblies to the other.

In the conventional terminal connectors of this type, the high electric potential of the cooling medium is caused to decline in the cooling medium terminal connector assembly. Throughout the specification, the present invention will be discussed as embodied in a water-cooled high-energy cable, but the concept of the invention can be equally advantageously utilized in any cable with internal cooling with employs a cooling other than water. When the water is used as the cooling medium, it is already known to construct the water terminal connector assembly as a substantially tubular insulator which is, on the one hand, so constructed as to be capable of withstanding the flow of the cooling water therethrough and, on the other hand, is capable of preventing an electric discharge over its outer surface even when the latter is contaminated.

The conventional terminal connectors of this type are provided with channels which, in order to obtain advantageous flow conditions therein, have exactly the same dimensions as the cooling channel provided in the electric cable and serving the purpose of cooling the electric conductor of the cable. However, the experience has shown that such a selection of the dimensions of the cooling channel of the terminal connector is less than advantageous. One particular disadvantage of such conventional terminal connectors is that, in order to keep the electric current flowing through the water in the region of the terminal connector, and the elevation of the temperature of the cooling water in such a region caused by the flow of the electric current therethrough, to a minimum, it is necessary to use as the cooling medium water of a high degree of purity, since such a highly pure water possesses a high specific resistivity coefficient, so that the amount of the electric current passing through the water in the region of the terminal connector is kept relatively low. It is true that it is possible to fill the cable with highly purified, decontaminated and de-ionized water; however, during the operation of the cooling system for cooling the cable, it is impossible to assure that some contaminants will not be entrained in the cooling water, such as, for instance, particles and impurities resulting from erosion of the inner surface of the cooling channel of the cable. Of course, the entrainment of the impurities results in an increase of the conductivity of the cooling water which, in turn, results in an increase in the current flowing through the water in the region of the terminal connector. These undesirable contaminants can be removed from the water, for example, by continuous purification of the cooling water during the operation of the cable and of the cooling system, or by replacing the contaminated cooling water after a certain period of operation of the cooling system by a new, purified cooling water. However, both of the above-described methods of keeping the cooling water devoid of contaminants are relatively expensive and increase the overall cost connected with construction and operation of the cable.

SUMMARY OF THE INVENTION

It is a general object of the present invention to avoid the disadvantages of the prior art devices.

More particularly, it is an object of the present invention to provide a terminal connector for internally cooled high-energy cables which is not possessed of the disadvantages of the prior-art terminal connectors.

It is a further object of the present invention to provide a terminal connector which does not necessitate for its operation water of a high degree of purity.

It is a concomitant object of the present invention to provide a terminal connector in which the temperature of the cooling water is not increased to any substantial degree.

It is yet another object of the present invention to reduce the overall energy losses in a cable-terminal connector system.

In pursuance of these objects and others which will become apparent hereafter, one of the features of the present invention resides, in a terminal connector for use with an internally cooled high-energy cable having a cooling channel of a predetermined cross section, in a terminal connector assembly for supplying the electric current to the cable and for withdrawing the electric current therefrom, and connected to the cable, another terminal connector assembly for supplying a cooling medium to the cooling channel of the cable and for discharging the spent cooling medium therefrom, the other terminal connector assembly being provided with a channel therethrough, the flow-through cross section of the channel being similar than the flow-through cross section of the cooling channel of the cable, and means for conducting the cooling medium from one of the terminal connector assemblies to the other assembly and communicating with the cooling channel of the cable.

The present invention is based on the recognition and utilization of the fact that when the diameter, and thus the flow-through cross section of the channel in the cooling medium terminal connector assembly is reduced in comparison with the diameter and flow-through cross section of the cooling channel of the cable, the cooling medium, such as water, will flow through the channel of the terminal connector assembly faster than through the cooling channel of the cable. This, in turn, results in shortening of the dwell time of the water in the channel of the terminal connector assembly, that is the time which any increment of the cooling water stream spends in the channel. Of course, the shorter dwell period will result in a reduction in the amount of heat accepted by such increment as it passes through the channel of the terminal connector assembly. As a result of this, it is no longer necessary to put such high requirements on the purity of the cooling water as heretofore necessary, so that, for instance, ordinary tap water can be utilized as the cooling medium. This can be explained in the following manner: while the electric conductivity of the partially contaminated water is higher than the conductivity of the purified or distilled water, which results in an increase of the current flowing through the cooling water in the terminal connector assembly for the cooling water, which, in turn, results in an increase in the amount of heat attendant to the passage of the electric current through the water, the shorter dwell time of the water in the terminal connector assembly for the cooling water at least counteracts these effects so that the overall heat development and acceptance by the water does not exceed the heat development and acceptance occurring when the diameter of the cooling channel of the cable is the same as the diameter of the channel of the terminal connector assembly for the cooling water when purified water is used as the cooling medium.

In a currently preferred embodiment of the invention, the channel is bounded by a tubular member accommodated in the interior of the terminal connector assembly for the cooling water, such tubular member being preferably made of an electrically insulating material, such as synthetic plastic material having the requisite properties. The advantage of the utilization of the tubular member in the terminal connector assembly for the cooling medium is to be seen in the fact that the same terminal connector assembly can be used for and in connection with cables having different diameters of the cooling channels, the only part to be replaced being the tubular member so that the diameter of the channel of the tubular member is proportionate to the diameter of the cooling channel of the cable. In this manner, the terminal connector can be accommodated to varying operating conditions.

It is also advantageous when, in accordance with a different aspect of the present invention, the channel is formed as a through hole of an insulator which constitutes the terminal connector assembly for the cooling water. The insulator may be made, for instance, of porcelain or a different insulating material conventional in the art. This construction presents a particularly inexpensive solution, coupled with the additional advantage from the viewpoint of the flow pattern in the channel, since the glazed ceramic surface bounding the channel presents only a minute resistance to the flow of the cooling water through the channel of the terminal connector assembly for the cooling water.

Another advantageous aspect of the present invention is the selection of the diameter of the connecting pipe connecting the two terminal connector assemblies at each end of the cable to correspond to the diameter of the channel of the terminal connector assembly for the cooling water. More particularly, the advantage of this construction is that the region of the reduction in diameter and thus flow-through cross section is transferred to the end of the connecting pipe which communicates with the cooling channel of the cable, that is relatively far away from the channel of the terminal connector assembly for the cooling water, which is particularly important when the terminal connector assembly for the cooling water is downstream of the terminal connector assembly for the electric current when considered in the direction of flow of the cooling water since the region of the turbulent flow which results from the reduction of the channel from the diameter corresponding to the cooling channel of the cable to the smaller diameter in the terminal connector assembly and the eddies in such region are relatively distant from the terminal connector assembly for the cooling water. The advantage of this is that the electric breakdown which could otherwise occur in the region of the eddies is avoided. In conformity with the requirement for excellent heat conduction and dissipation, and in order to utilize as few different materials as possible, the connecting pipe may be of a metallic material and particularly, when the tubular member defining the cooling channel of the cable is of alloyed steel, also of alloyed steel.

Experience has shown that very advantageous conditions prevail when the diameter of the channel of the terminal connector assembly for the cooling water is equal to approximately half of the diameter of the cooling channel of the high-energy cable. As a result of the halving of the diameter of the channel provided within the terminal connector assembly for the cooling water with respect to the diameter of the cooling channel of the cable, the temperature in the aforementioned channel is increased only by a fourth of the temperature increase which would be encountered if the diameters were the same. Conversely, this also means that if the permissible temperature increase in the channel in the terminal connector assembly for the cooling water is the same as the permitted temperature increase in the channel having the same diameter as the cooling channel of the cable, then the cooling water may have four times the conductivity of the purified water. The aforementioned dimensions of the channel in the terminal connector assembly for the cooling water are valid when the high-energy cable has a length which exceeds the length of the terminal connector assembly for the cooling water at least a thousand times, and when the pressure difference connected with the passage of the cooling medium through the channel of the terminal connector assembly for the cooling water is only one twentieth of the pressure difference along the course of the high-energy cable. In this event, the increased pressure difference in the terminal connector assembly for the cooling water has no discernible influence on the pressure and flow conditions in the cooling channel of the high-energy cable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing is a partially sectioned view of a terminal connector of the present invention.

DESCRIPTION OF THE PREFERRED EMBODIMENTS

The terminal connector is illustrated in the sole FIGURE as including a terminal connector assembly 1 for supplying electric current to the electric conductor of a high-energy electric cable 3, or for withdrawing the electric current therefrom, depending at which end of the cable the particular terminal connector assembly 1 is situated. The terminal connector further includes a terminal connector assembly 2 for supplying the cooling medium, such as water, to the cable 3 or for discharging the spent cooling medium therefrom. The cable 3 is of a conventional construction, and is provided with a cooling channel which has a predetermined diameter and thus a predetermined flow-through cross section. The cooling medium, such as water, flows through the cooling channel of the cable 3 from one end of the cable 3 to the other end, at least one of the ends being provided with the terminal connector of the present invention. To facilitate the further discussion, the terminal connector will be discussed as being located at the downstream end of the cable 3 when considered in the direction of flow of the cooling medium, such as cooling water. In that event, the terminal connector assembly 1 is located upstream of the terminal connector assembly 2. Of course, the situation is reversed in the case of a terminal connector located at the upstream end of the cable. A connecting pipe 4 extends between and interconnects and communicates the terminal connector assemblies 1 and 2. In the illustrated embodiment, the connecting pipe 4 interconnects the upper end portions of the two standing terminal connector assemblies 1 and 2, and extends along a semicircular path.

The terminal connector assembly 1 substantially corresponds to the conventional assemblies of this type for use in connection with high-energy cables, and in the illustrated embodiment it consists of a porcelain insulator 10 in the interior 11 of which the high-energy cable 3 terminates, while a water-cooled electric conductor 32 of the cable 3 leads to the upper end of the terminal connector assembly 1 and is there connected with the connecting pipe 4 by a conventional connecting arrangement. When the inner tubular member of the cable 3 which defines the cooling channel therein is made of alloyed steel, then the connecting pipe 4 is preferably also made of alloyed steel. The connecting pipe 4 is mechanically connected to the terminal connector assembly 1 by means of a clamping device 42, and it has an interior channel 41 which has an inner diameter that is smaller than the diameter of the cooling channel of the cable 3, and which communicates the interior of the terminal connector assembly 1 with the interior of the terminal connector assembly 2. The inner diameter of the interior channel 41 of the pipe 4 may decrease suddenly, or gradually as illustrated in the drawing. The juncture of the connecting pipe 4 with the terminal connector assembly 2 is fluid-tightly sealed with respect to the exterior of the terminal connector assembly 2. A clamping device 43 connects the pipe 4 with the terminal connector assembly 2.

An electric terminal clamp 44 is connected to the pipe 4 upwardly of the terminal connector assembly 1 and serves the purpose of either supplying electric current from a source to the pipe 4 and via the same to the electric conductor 32 of the cable 3, or for withdrawing current and supplying it to a user depending on the fact at which end of the cable the terminal connector is used.

The terminal connector assembly 2 for the cooling water includes a porcelain insulator 20 provided with a through hole or channel 6 which in the illustrated embodiment is circumferentially bounded by an insulating tubular member 5. The connecting pipe 4 communicates with the interior of the terminal connector assembly 2 at its upper end, while at the lower end a metallic pipe 7 communicates with the interior of the terminal connector assembly, which metallic pipe 7 is at the potential of the ground. The juncture of the metallic pipe 7 with the terminal connector assembly 2 is again fluid-tightly sealed. A clamping device 71 connects the pipe 7 to the terminal connector assembly 2. The metallic pipe 7 serves for conducting the spent cooling fluid to a cooling station located downstream of the terminal connector.

The high electric potential of the water which flows from the terminal connector assembly 1 to the terminal connector assembly 2 through the connecting pipe 4 declines in the terminal connector assembly 2 to the ground potential. In the illustrated currently preferred embodiment, the terminal connector assembly 2 for the cooling water essentially consists of a tubular insulator 20 made of, for instance, porcelain. The insulator 20 may be so constructed that its interior can withstand the flow of the cooling medium therethrough without damage to the terminal connector assembly 2 so that the tubular member 5 can be omitted, and the exterior of the same is capable of preventing electric discharge or breakdown even when the exterior surface of the terminal connector assembly 2 is heavily soiled.

The arrangement of the terminal connector assembly 2 for the cooling water may be such as illustrated in the drawing, that is, the two terminal connector assemblies 1 and 2 may extend parallel to one another, in which case the terminal connector assembles 1 and 2 may be mounted in their upright positions on a mounting plate or a base. However, it is also conceivable that the terminal connector assembly 2 may extend substantially horizontally at a level above the terminal connector assembly 1, in which event the connecting pipe 4 would extend along a circular arc corresponding to a central angle of approximately 90°. An alternative, equally likely, arrangement may have the terminal connector assembly extend substantially vertically above the terminal connector 1, in which case the connecting pipe 1 may be a straight pipe interconnecting and communicating the two terminal connecting assemblies 1 and 2 of the terminal connector.

The cable itself, and the arrangement for supplying the current to the terminal connector assembly 1 and for withdrawing the current therefrom, depending on the end at which such a terminal connector is used, are of conventional constructions so that they will be described only to the extent necessary for understanding the present invention. The cable 3 has a corrugated outer jacket 31 which surrounds the electric conductor 32 and terminates in the lower part of the terminal connector assembly 1, while the electric conductor 32 passes through the interior 11 of the insulator 10 and is connected to the pipe 4. A sealing arrangement, for instance a lead sealing 15, connects the jacket 31 to the terminal connector assembly 1 and seals the interior 11 of the insulator 10 with respect to its exterior. An insulating unit 12 having conical portions 13 and 14 surrounds the electric conductor 32 of the cable 3 adjacent the end of the jacket 31, and it may consist of superimposed layers of oil paper. A metallic band is wound around the conical portion 14 of the insulating unit 12 in order to make the portion 14 electrically conductive. The purpose of the insulating unit 14, and particularly of the conical portions 13 and 14 thereof, is to attenuate the electric field of the cable 3. To provide for an even better insulation, the interior 11 of the insulator 10 may be filled with an insulating medium, such as an insulating oil. While the terminal connector has been discussed as employed at the downstream end of the cable 3, it may be used to advantage also at the upstream end, in which case the metallic pipe 7 will be used for delivering the cooling liquid to the cable.

It will be understood that each of the elements described above, or two or more together, may also find a useful application in other types of internally cooled cables differing from the types described above.

While the invention has been illustrated and described as embodied in a high-energy electric cable, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cable assembly comprising, in combination, an internally cooled high-energy cable having a cooling channel of a predetermined flow-through cross section for passage of a cooling medium therethrough; and a terminal connector including a current-carrying first terminal connector assembly connected to said cable, a second terminal connector assembly for the cooling medium having a channel for passage of the cooling medium therethrough, the flow-through cross-section of said channel being smaller than said predetermined flow-through cross section of said cooling channel of said cable, and means for conducting the cooling medium from one of said assemblies to the other and communicating said channel with said cooling channel of said cable.

2. A combination as defined in claim 1, wherein said second terminal connector assembly includes a tubular member bounding said channel.

3. A combination as defined in claim 2, wherein said tubular member is of an electrically insulating material.

4. A combination as defined in claim 3, wherein said material is synthetic plastic material.

5. A combination as defined in claim 1, wherein said second terminal connector assembly includes an insulator; and wherein said channel is a through passage formed in said insulator.

6. A combination as defined in claim 5, wherein said insulator is of porcelain.

7. A combination as defined in claim 1, wherein said conducting means includes a pipe.

8. A combination as defined in claim 7, wherein said pipe has substantially the same flow-through cross section as said channel.

9. A combination as defined in claim 7, wherein said pipe is of a metallic material.

10. A combination as defined in claim 9, wherein said metallic material is alloyed steel.

11. A combination as defined in claim 1, wherein said cooling channel of said cable and said channel of said second terminal connector are of circular cross sections; and wherein the diameter of said channel is substantially a half of the diameter of said cooling channel.

* * * * *